(12) United States Patent
Zhang et al.

(10) Patent No.: US 9,979,322 B2
(45) Date of Patent: May 22, 2018

(54) MODULATOR FOR A HYBRID CONVERTER SYSTEM

(71) Applicant: General Electric Company, Schenectady, NY (US)

(72) Inventors: Di Zhang, Niskayuna, NY (US); Rui Zhou, Niskayuna, NY (US); Luis Garces, Niskayuna, NY (US); Jiangbiao He, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 479 days.

(21) Appl. No.: 15/192,023

(22) Filed: Jun. 24, 2016

(65) Prior Publication Data
US 2017/0373586 A1    Dec. 28, 2017

(51) Int. Cl.
*H02M 7/5395*   (2006.01)
*H02M 1/00*   (2006.01)
*H02M 7/487*   (2007.01)

(52) U.S. Cl.
CPC .......... *H02M 7/5395* (2013.01); *H02M 7/487* (2013.01); *H02M 2001/0048* (2013.01); *H02M 2001/0054* (2013.01)

(58) Field of Classification Search
CPC ....... H02M 7/5395; H02M 2001/0054; H02M 7/487; H02M 2001/0048
See application file for complete search history.

(56) References Cited

U.S. PATENT DOCUMENTS

| | | | |
|---|---|---|---|
| 5,982,646 A | 11/1999 | Lyons et al. | |
| 6,058,031 A | 5/2000 | Lyons et al. | |
| 6,697,274 B2 | 2/2004 | Bernet et al. | |
| 7,495,938 B2 | 2/2009 | Wu et al. | |
| 8,144,490 B2 | 3/2012 | El-Barbari et al. | |
| 8,929,114 B2 | 1/2015 | Li et al. | |

OTHER PUBLICATIONS

J Li et al., "Three-level Active Neutral-Point-Clamped Zero-Current-Transition Converter for Sustainable Energy Systems", IEEE Transactions on Power Electronics, vol. 26, Issue: 12, pp. 3680-3693, Dec. 2011.

(Continued)

*Primary Examiner* — Robert Deberadinis
(74) *Attorney, Agent, or Firm* — Nitin N. Joshi

(57) ABSTRACT

The present disclosure is directed to a system and method for modulating a voltage output of a hybrid converter system having first and second set of Si-based power electronic devices coupled to first and second voltage source, respectively, and a first set of SiC-based power electronic devices coupled to the first and second sets of Si-based power electronic devices. The method includes switching between operational states of the hybrid converter system based on a desired voltage output, wherein each operational state includes one of the Si-based power electronic devices from the first and second sets of Si-based power electronic devices and one of the SiC-based devices from the first set of SiC-based power electronic devices being switched on and the remaining power electronic devices being switched off. Each SiC-based power electronic device of the first set of SiC-based power electronic devices switches at a higher frequency as compared to each Si-based power electronic device of the first and second sets of the Si-based power electronic devices.

20 Claims, 18 Drawing Sheets

(56) References Cited

OTHER PUBLICATIONS

S R Pulikanti et al., "DC-Link Voltage Ripple Compensation for Multilevel Active-Neutral-Point-Clamped Converters Operated With SHE-PWM", IEEE Transactions on Power Delivery, vol. 27, Issue: 4, pp. 2176-2184, Oct. 2012.

Y Jiao et al., "New Modulation Scheme for Three-Level Active Neutral-Point-Clamped Converter With Loss and Stress Reduction", IEEE Transactions on Industrial Electronics, vol. 62, Issue: 9, pp. 5468-5479, Sep. 2015.

MODULATOR FOR A HYBRID CONVERTER SYSTEM

This invention was made with Government support under contract NNC15CA29C awarded by the National Aeronautics and Space Administration. The Government has certain rights in the invention.

FIELD OF THE INVENTION

The subject matter disclosed herein relates generally to voltage converter systems. More specifically, the present disclosure relates to a modulator for a hybrid voltage converter system having different types of switches so as to reduce switching losses and improve efficiency.

BACKGROUND OF THE INVENTION

Silicon carbide (SiC) is a semiconductor that is increasingly being used in power electronic devices such as metal-oxide-semiconductor field-effect transistor (MOSFETs). SiC power electronic devices generally have relatively low switching losses at relatively high switching rates (e.g., kilohertz (kHz) range), operate at relatively high junction temperatures, and operate at relatively high voltages as compared to other power electronic devices that do not employ silicon carbide within the respective device. As such, SiC power electronic devices have gained interest in recent years in view of their switching performance and high temperature operation capabilities.

However, since the costs of manufacturing SiC-based power electronic devices are not comparable to other power electronic devices, other silicon-based (Si) power electronic devices, such as insulated-gate bipolar transistors (IGBTs) are used as a low cost alternative to using systems having SiC power electronic devices. For example, U.S. patent application Ser. No. 14/983,010 entitled "Hybrid Converter System" filed on Dec. 29, 2015, which is incorporated herein by reference in its entirety, describes a hybrid three-level active neutral point clamped converter that utilizes both SiC-based power electronic devices, as well as Si-based power electronic devices.

Thus, the present disclosure is directed to a system and method for modulating a hybrid converter system, such as the hybrid three-level active neutral point clamped converter disclosed above, so as to obtain the benefits from both SiC-based and Si-based power electronic devices.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for modulating a voltage output of a hybrid converter system. The hybrid converter system includes a first set of silicon (Si)-based power electronic devices coupled to a first voltage source, a second set of Si-based power electronic devices coupled to a second voltage source, and a first set of silicon-carbide (SiC)-based power electronic devices coupled to the first and second sets of Si-based power electronic devices. As such, the method includes switching between operational states of the hybrid converter system based on a desired voltage output, wherein each operational state includes one of the Si-based power electronic devices from each of the first and second sets of Si-based power electronic devices and one of the SiC-based devices from the first set of SiC-based power electronic devices being switched on and the remaining Si-based and SiC-based power electronic devices being switched off. As such, the method may switch between each of the operational states by alternating which of the Si-based power electronic devices from each of the first and second sets of Si-based power electronic devices and the SiC-based devices from the first set of SiC-based power electronic devices are switched on and off. Further, each SiC-based power electronic device of the first set of SiC-based power electronic devices switches at a higher frequency as compared to each Si-based power electronic device of the first and second sets of the Si-based power electronic devices.

In one embodiment, the step of switching between the operational states may include providing, via a processor, turn-on first gate signals to one of the Si-based power electronic devices from each of the first and second sets of Si-based power electronic devices and one of the SiC-based devices from the first set of SiC-based power electronic devices based on a desired voltage output, and providing, via the processor, turn-off gate signals to the remaining Si-based and SiC-based power electronic devices based on the desired voltage output.

In another embodiment, the operational states of the voltage converter may include a positive state, a p-type zero state, a negative state, and an n-type zero state. As such, in certain embodiments, during the positive state of the voltage converter, the method may include switching on a first Si-based power electronic device from the first set of Si-based power electronic devices, a third Si-based power electronic devices from the second set of Si-based power electronic devices, and a first SiC-based power electronic device from the first set of SiC-based power electronic devices, wherein a voltage output of the positive state comprises a positive voltage value.

In further embodiments, the method may include switching from the positive state of the voltage converter to the p-type zero state by switching off the first SiC-based power electronic device from the first set of SiC-based power electronic devices and switching on a second SiC-based power electronic device from the first set of SiC-based power electronic devices, wherein a voltage output of the p-type zero state is zero.

In additional embodiments, the method may include switching from the p-type zero state of the voltage converter to the negative state by switching off the first and third Si-based power electronic devices and switching on the second and fourth Si-based power electronic devices, wherein the second SiC-based power electronic device from the first set of SiC-based power electronic devices remains switched on and the first SiC-based power electronic device from the first set of SiC-based power electronic devices remains switched off, wherein a voltage output of the negative state comprises a negative voltage value.

In yet another embodiment, the method may include switching from the negative state of the voltage converter to the n-type zero state by switching on the first SiC-based power electronic device from the first set of SiC-based power electronic devices and switching off the second SiC-based power electronic device from the first set of SiC-based power electronic devices, wherein a voltage output of the n-type zero state is zero.

In still a further embodiment, the method may include switching from the n-type zero state to the positive state by switching off the second and fourth Si-based power electronic devices and switching on the first and third Si-based power electronic devices, wherein the second SiC-based power electronic device from the first set of SiC-based power electronic devices remains switched off and the first SiC-based power electronic device from the first set of SiC-based power electronic devices remains switched on.

In additional embodiments, the method may also include coupling a snubber capacitor between the SiC-based power electronic devices. As such, the snubber capacitor may be configured to reduce switching losses of the hybrid converter system.

In further embodiments, each Si-based power electronic device of the first and second sets of Si-based power electronic devices may be configured to switch at a fundamental frequency. In addition, in particular embodiments, each SiC-based power electronic device of the first set of SiC-based power electronic devices may be configured to switch at a switching frequency comprising one kilo-Hertz (kHz) or greater.

In certain embodiments, each of the first and second sets of Si-based power electronic devices may include one or more insulated-gate bipolar transistors (IGBTs), whereas the first set of SiC-based power electronic devices may include one or more metal-oxide-semiconductor field-effect transistors (MOSFETs).

In another aspect, the present disclosure is directed to a system for modulating a voltage output of a hybrid converter system having a first set of silicon (Si)-based power electronic devices coupled to a first voltage source, a second set of Si-based power electronic devices coupled to a second voltage source, and a first set of silicon-carbide (SiC)-based power electronic devices coupled to the first and second sets of Si-based power electronic devices. The system includes a controller having one or more processors configured to perform one or more operations, including but not limited to switching between operational states of the hybrid converter system based on a desired voltage output, wherein each operational state includes one of the Si-based power electronic devices from each of the first and second sets of Si-based power electronic devices and one of the SiC-based devices from the first set of SiC-based power electronic devices being switched on and the remaining Si-based and SiC-based power electronic devices being switched off. Further, each SiC-based power electronic device of the first set of SiC-based power electronic devices switches at a higher frequency as compared to each Si-based power electronic device of the first and second sets of the Si-based power electronic devices.

In yet another aspect, the present disclosure is directed to a method for modulating a voltage output of a hybrid converter system having a first set of silicon (Si)-based power electronic devices coupled to a first voltage source, a second set of Si-based power electronic devices coupled to a second voltage source, and a first set of silicon-carbide (SiC)-based power electronic devices coupled to the first and second sets of Si-based power electronic devices. The method includes switching on one of the Si-based power electronic devices from each of the first and second sets of Si-based power electronic devices and one of the SiC-based devices from the first set of SiC-based power electronic devices. The method also includes switching off the remaining Si-based power electronic devices and the remaining SiC-based power electronic devices. Further, the method includes switching an operational state of the hybrid converter system based on a desired voltage output by alternating which Si-based power electronic devices and SiC-based power electronic devices are switched on and off. Moreover, each SiC-based power electronic device of the first set of SiC-based power electronic devices switches only at switching frequency of one kilo-Hertz (kHz) or greater and each Si-based power electronic device of the first and second sets of Si-based power electronic devices switches only at a fundamental frequency that is lower than the switching frequency.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
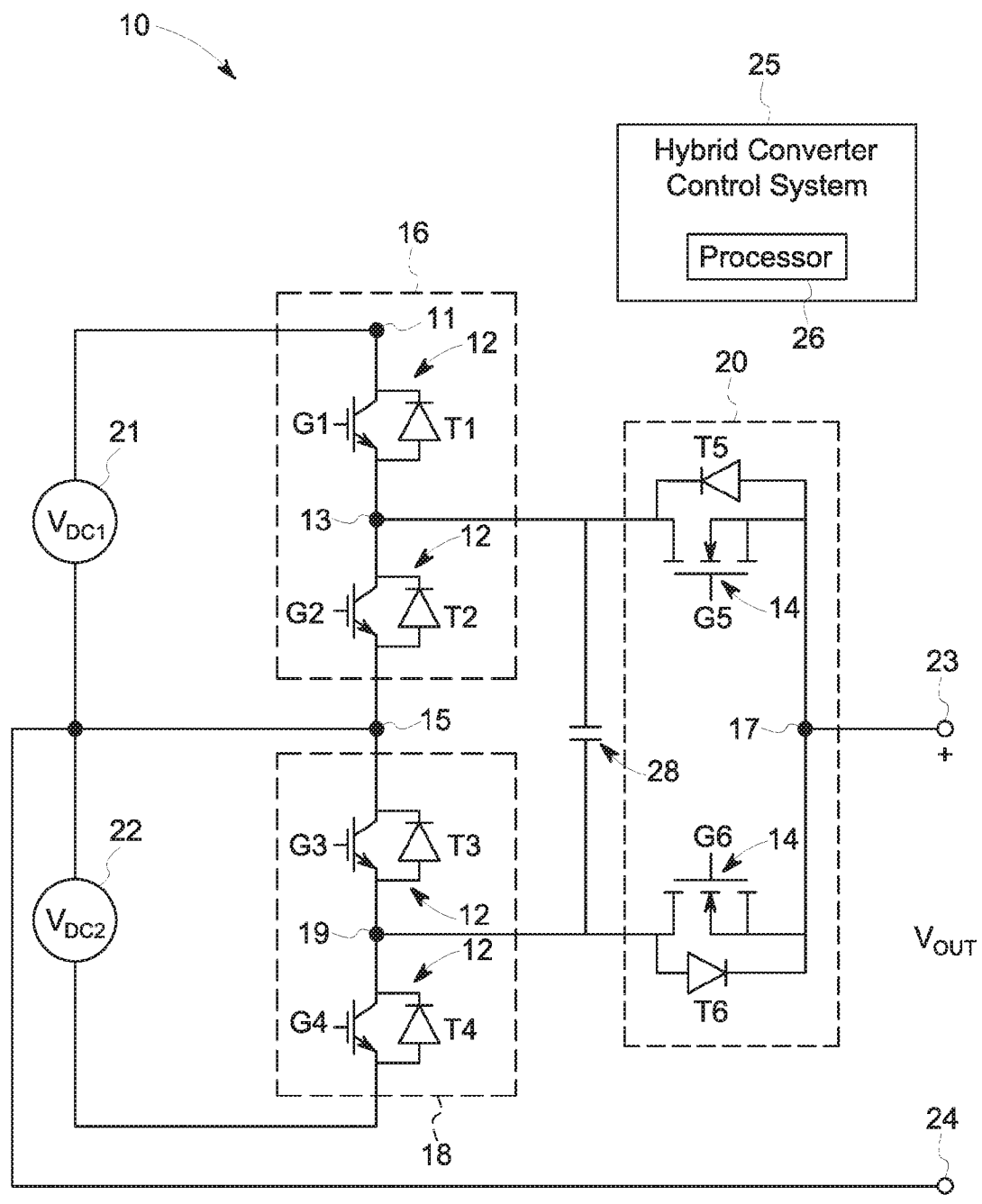
FIG. 1 illustrates a schematic diagram of one embodiment of a three-level hybrid converter system according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

Silicon (Si) power electronic devices are widely used in various power conversion systems (e.g., rectifiers, inverters) to convert voltage signals from alternating current (AC) voltage signals to direct current (DC) voltage signals, and vice versa. However, silicon-based power electronic devices, such as silicon insulated-gate bipolar transistors (IGBTs), may lose an increasing portion of their energy as heat loss during high-frequency switching. As such, the performance of silicon-based power electronic devices maybe limited to some switching frequency (e.g., 1 kHz).

In contrast to silicon-based power electronic devices, silicon carbide-based (SiC) power electronic devices, such as silicon carbide metal-oxide-semiconductor field-effect transistors (MOSFETs), may exhibit significantly lower switching losses as compared to silicon-based power electronic devices. As such, SiC power electronic devices may operate more efficiently than Si power electronic devices when switching frequently (e.g., >1 kHz) and at higher temperatures.

Although the switching losses for Si power electronic devices may be larger than the switching losses for SiC power electronic devices, the conduction losses (or the voltage drop) across the Si power electronic devices may remain relatively constant or increase at a slower rate as compared to the conduction losses for the SiC power electronic devices. That is, due to the structure of Si power electronic devices, such as Si IGBTs, the voltage drop across the Si power electronic device may generally be lower as compared to the SiC power electronic device, such as the SiC MOSFET, for the same current rating.

With the foregoing in mind, in one embodiment, both Si-based power electronic devices and SiC-based power electronic devices may be used together in a circuit to perform power conversion operations more efficiently. That is, a presently disclosed hybrid converter system generally employs Si power electronic devices that switch within a certain low frequency range (e.g., 0-1 kHz, line frequency, fundamental frequency) along with SiC power electronic devices that switch at a higher frequency range (e.g. >1 kHz). By switching the Si power electronic devices at a line or fundamental frequency and using SiC power electronic devices to switch at high frequencies, the hybrid converter system may produce a high quality voltage output that maximizes the benefit of the low switching loss properties of the SiC power electronic devices. Moreover, the hybrid converter system may coordinate gate signals provided to the Si power electronic devices and the SiC power electronic devices, such that the Si power electronic devices may carry zero current while they are switching. As such, the Si power electronic devices may have no switching loss.

Referring now to the figures, FIG. 1 illustrates a schematic diagram of one embodiment of a three-level hybrid converter system 10 that incorporates both Si-based power electronic devices and SiC-based power electronic devices to convert DC voltage signals to AC voltage signals and vice versa according to the present disclosure. As shown, the three-level hybrid converter system 10 (hybrid converter system 10) may be characterized as an active neutral point clamped multilevel converter with hybrid switch assembly that uses both Si-based power electronic devices and SiC-based power electronic devices so as to obtain the benefits from both types of switches. It should be noted that the schematic diagram of FIG. 1 may represent one phase leg of a multi-phase converter system. As such, the three-level hybrid converter system 10 may be employed on one or more legs of such a multi-phase converter system.

In one embodiment, the Si-based power electronic devices and the SiC-based power electronic devices of the hybrid converter system 10 may include, at least, a first set 16 of Si IGBTs 12, a second set 18 of Si IGBTs, and a first set 20 of SiC MOSFETs 14, respectively. The first and second sets 16, 18 of Si IGBTs 12 may include various types of IGBTs of different ratings (e.g., 1.7 kV, 3.3 kV, 4.5 kV, or 6.5 kV IGBT) that use silicon as the semiconductor material to switch between conductive to non-conductive states. In the same manner, the first set 20 of the SiC MOSFETs may include various types of MOSFETs of different ratings that use SiC as the semiconductor material to switch between conductive to nonconductive states. Although the following descriptions of various hybrid converter systems will be discussed with regard to the illustrated Si IGBTs 12 and the SiC MOSFETs 14, it should be noted that, in other embodiments, any suitable type of Si-based power electronic devices and SiC-based power electronic devices may be used in lieu of the Si IGBTs 12 and the SiC MOSFETs 14.

In some embodiments, multiple Si IGBTs 12 may be grouped together as part of a module or set (e.g. first and second sets 16 and 18). For example, in the illustrated hybrid converter system 10, the first set 16 of Si-based power electronic devices includes two Si IGBTs 12 electrically coupled in series with each other so as to provide three interconnection nodes (e.g., 11, 13, 15) where the first set 16 may be coupled to other electrical components. The interconnection nodes may be located at a collector side of one of the Si IGBTs 12, at an emitter side of one of the Si IGBTs 12, and/or in between the Si IGBTs 12.

In the same manner, multiple SiC MOSFETs 14 may be grouped together as part of the first set 20 of SiC-based power electronic devices, such that two SiC MOSFETs 14 may be electrically coupled in series with each other. In additional embodiments, as shown in FIGS. 1 and 4-17, the hybrid converter system 10 may also include a snubber capacitor 28 coupled between the SiC-based power electronic devices. As such, the snubber capacitor 28 may be configured to reduce switching losses of the hybrid converter system 10, which will be described in more detail below. Moreover, the first set 20 of SiC-based power electronic devices may also have three interconnection nodes (e.g., 13, 17, 19) where the first set 20 of SiC-based power electronic devices may be coupled to other electrical components. The interconnection nodes of the first set 20 SiC-based power electronic devices may be located at a drain side of one of the SiC MOSFETs 14, at a source side of one of the SiC MOSFETs 14, and/or in between the SiC MOSFETs 14.

In certain embodiments, the multiple sets 16, 18, and 20 of power electronic devices may include standardized, interchangeable components that may be used to build the hybrid converter system 10. As such, the sets 16, 18, and 20 may each be manufactured individually and be made available for assemblers to create different hybrid converter systems having different voltage and current ratings using standard building components.

With this in mind, each Si IGBT module 16, 18 of the hybrid converter system 10 may be coupled across a voltage source (e.g., first DC voltage source 21 and second DC voltage source 22). The intersection node (e.g., 13, 19) or output of each Si IGBT module 16, 18 may then be coupled in series with the SiC MOSFET module 20. For instance, the interconnection node between the Si IGBTs 12 of the modules 16, 18 may be coupled to a source side and a drain side of the SiC MOSFETs of the module 20.

The output voltage of the hybrid converter system 10 may be provided at the output terminals (e.g., 23, 24), which are connected to the interconnection node (e.g., 17) between the SiC MOSFETs of the module 20 and to the interconnection node (e.g., 15) between the voltage sources 21, 22. In some embodiments, the voltage sources 21, 22 both provide the same amount of DC voltage. As such, the Si IGBTs 12 and the SiC MOSFETs 14 may be switched on and off in a controlled manner to convert a DC voltage signal provided via the voltage sources 21, 22 to an AC voltage signal output by the hybrid converter system 10. The AC voltage signal output may then be provided to various types of AC powered devices, such as AC motors and the like, to perform various types of operations.

In one embodiment, the switching of the Si IGBTs 12 and the SiC MOSFETs 14 may be controlled by gate signals provided to gates of the Si IGBTs 12 and the SiC MOSFETs 14. As such, the hybrid converter system 10 may include a hybrid converter control system 25, which may provide gate signals to each of the Si IGBTs 12 and the SiC MOSFETs 14 in the hybrid converter system 10 to control operation of the hybrid converter system 10.

The hybrid converter control system 25 may generally include a processor 26 that determines appropriate gate signals to provide to the Si IGBTs 12 and the SiC MOSFETs 14 of the hybrid converter system 10 to produce a desired AC voltage output signal using the DC voltage sources 21, 22. The processor 26 may be any type of computer processor or microprocessor capable of executing computer-executable instructions (e.g., software code, programs, or applications). The processor 26 may also include multiple processors that may cooperate to perform the operations described below.

Figure 2:
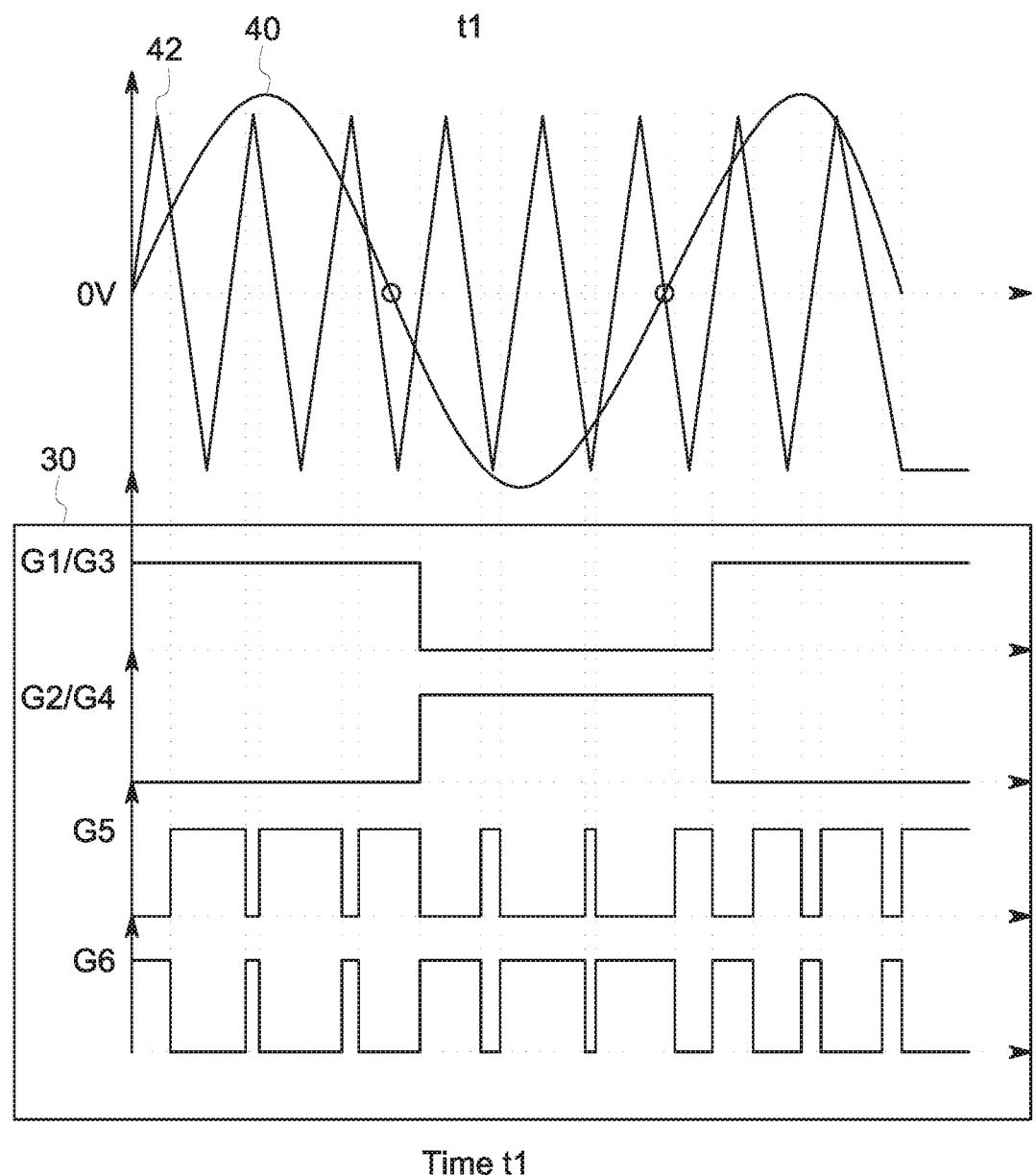
FIG. 2 illustrates a graph of one embodiment of a voltage output by the hybrid converter system along with a timing diagram of gate signals provided to switching devices in the hybrid converter system of FIG. 1.

Generally, as discussed above, the processor 26 may execute software applications that include programs to determine gate signals to provide to the Si IGBTs 12 and the SiC MOSFETs 14, such that the resulting AC voltage output corresponds to a desired voltage signal. For example, FIG. 2 illustrates an example timing diagram 30 of gate signals provided to respective gates of the Si IGBTs 12 and the SiC MOSFETs 14 for the embodiment of the hybrid converter system 10 of FIG. 1.

In certain embodiments, the processor 26 may provide gate signals to the Si IGBTs 12 and the SiC MOSFETs 14 such that at least one Si IGBT 12 will be in series with one SiC MOSFET 14 at any given time. Additionally, the processor 26 may send gate signals to one or more of the Si IGBTs 12 to cause the Si IGBTs 12 to switch at a fundamental line frequency (e.g., 60 Hz) and send gate signals to the SiC MOSFETs 14 to switch at a higher, switching frequency (e.g., >1 kHz) to synthesize the desired AC voltage output waveform. Accordingly, as shown in FIG. 2, the gate signals (e.g., G1, G2, G3, G4) provided to the Si IGBTs 12 change less frequently as compared to the gate signals (e.g., G5, G6) provided to the SiC MOSFETs 14. As a result, AC voltage output 40 (reference wave) may correspond to a desired sine wave. FIG. 2 also depicts a carrier wave 42. The intersection of the carrier wave 42 and the AC voltage output 40 generally forms a square waveform or a pulse width modulation (PWM) gate waveform, which can be used to control the Si IGBTs 12 and the SiC MOSFETs 14.

With the foregoing in mind, to produce the desired voltage output 40, the processor 26 may coordinate the gate signals provided to the Si IGBTs 12 and the SiC MOSFETs 14 such that at least one Si IGBT 12 will be activated together in electrical series with one SiC MOSFET 14 at any given time and conduct current in series with each other, as discussed herein. For example, referring to FIG. 4, switch T1 (e.g. Si IGBT 12), switch T3, and switch T5 (e.g., SiC MOSFET 14) may be in switched on in series with each other during some time interval, i.e. for a positive operational state.

Figure 3:
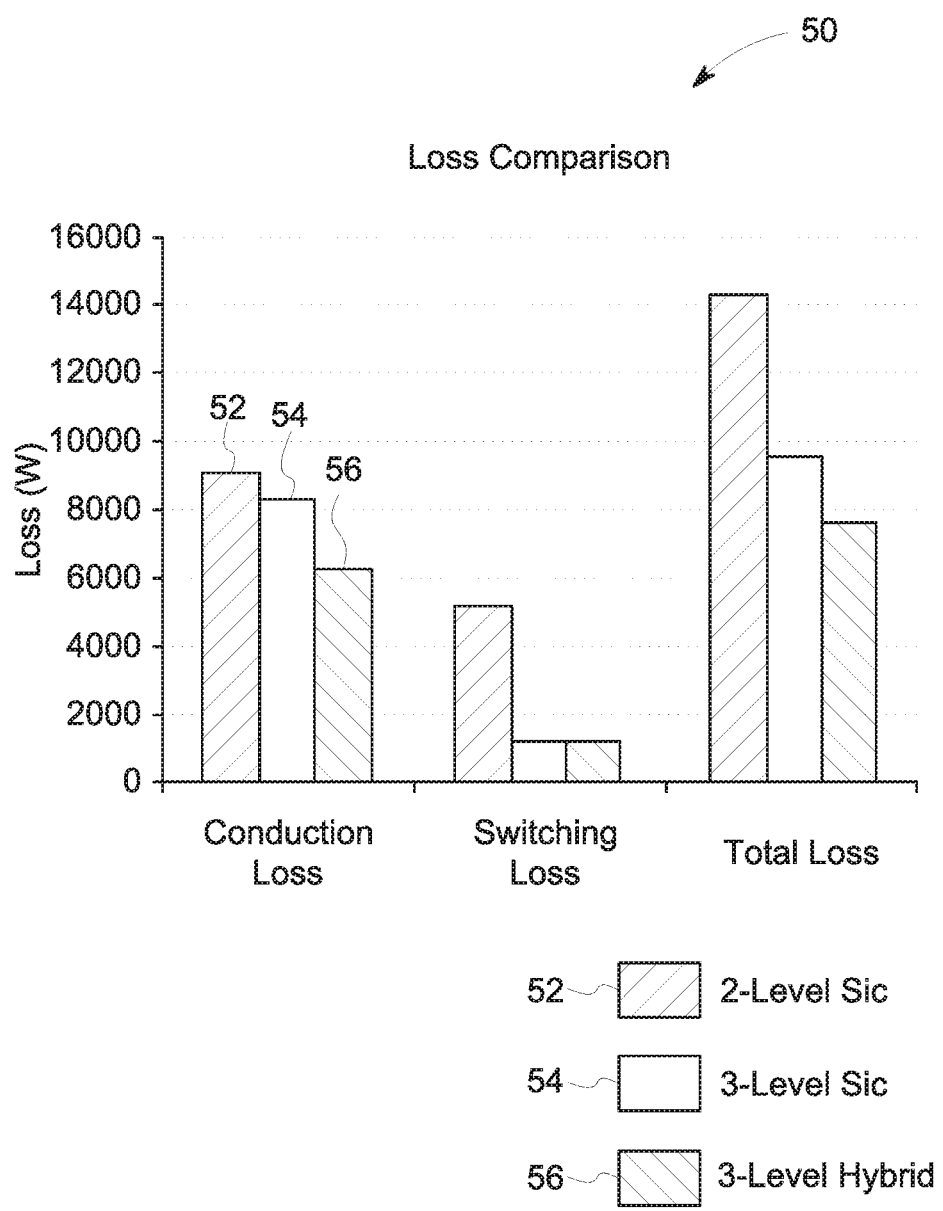
FIG. 3 illustrates a bar graph that compares energy losses for different types of converter systems according to the present disclosure.
Figure 4:
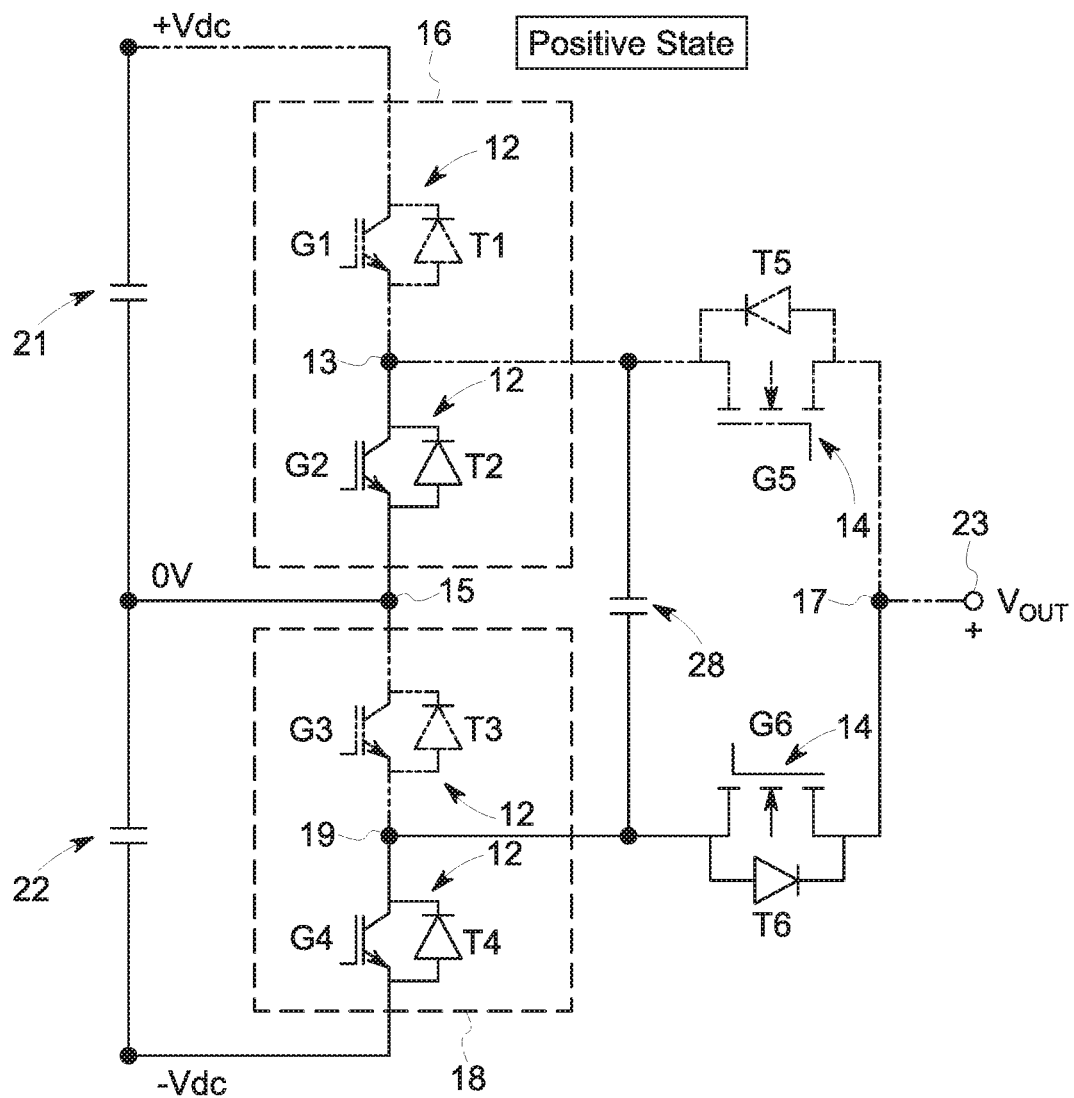
FIG. 4 illustrates a schematic diagram of another embodiment of a three-level hybrid converter system according to the present disclosure, particularly illustrating a positive state of the hybrid converter system.
Figure 5:
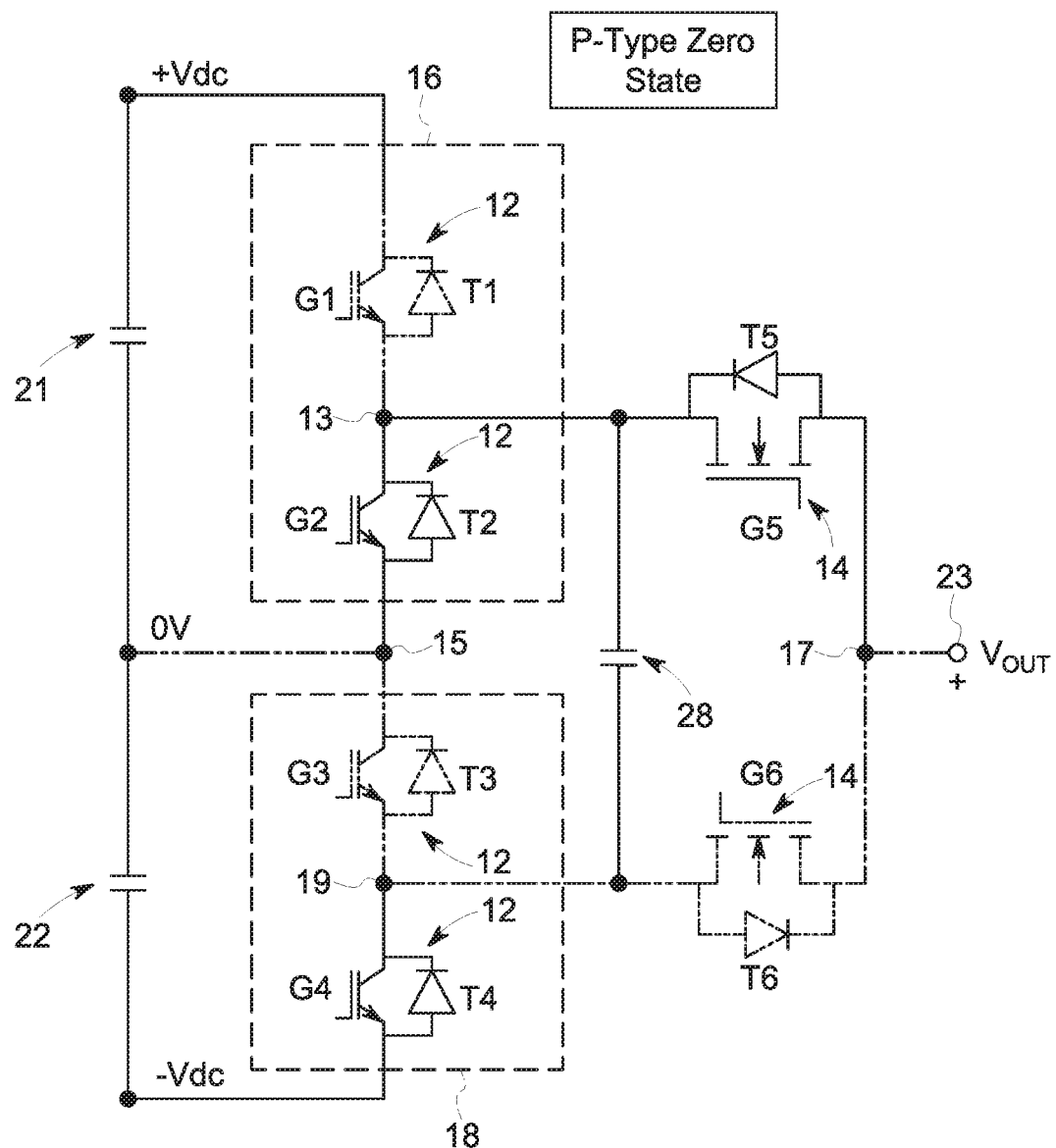
FIG. 5 illustrates a schematic diagram of still another embodiment of a three-level hybrid converter system according to the present disclosure, particularly illustrating a p-type zero state of the hybrid converter system.
Figure 6:
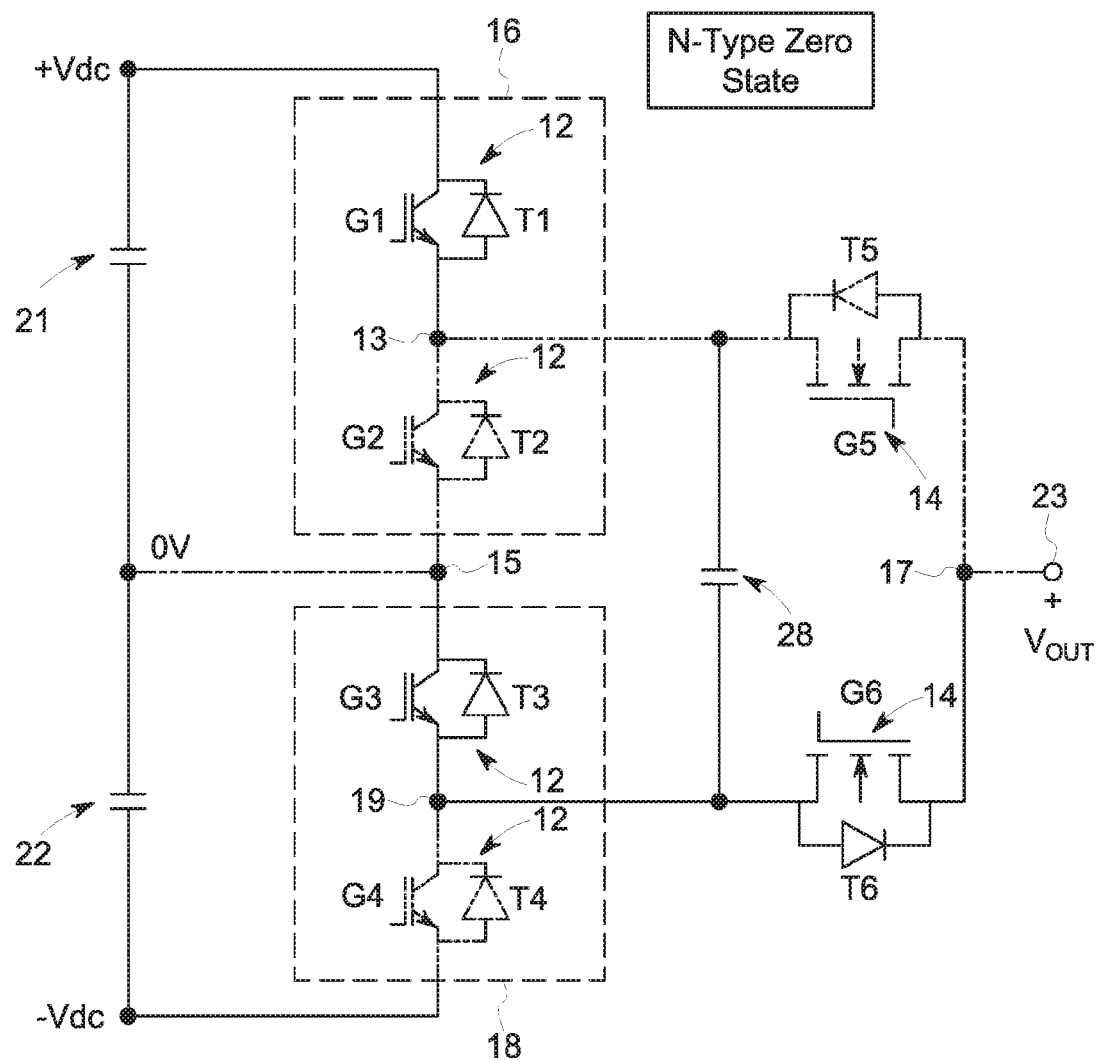
FIG. 6 illustrates a schematic diagram of yet another embodiment of a three-level hybrid converter system according to the present disclosure, particularly illustrating an n-type zero state of the hybrid converter system.

It should be noted, that by using the hybrid converter system 10 described above, the converter system is more efficient than a converter system that uses just SiC power electronic devices. For example, FIG. 3 illustrates a bar graph 50 that compares energy losses for a two-level converter system using just SiC power electronic devices (e.g., bar 52), a three-level converter system using just SiC power electronic devices (e.g., bar 54), and a three-level hybrid converter system that corresponds to the hybrid converter system 10 of FIG. 1 (e.g., bar 56).

As shown, the graph 50 compares the losses that occur in a two-level converter system using just SiC power electronic devices (e.g., bar 52), a three-level converter system using just SiC power electronic devices (e.g., bar 54), and a three-level hybrid converter system that corresponds to the hybrid converter system 10 of FIG. 1 (e.g., bar 56) employed in a 1.5 MW/4.16 kV high-speed medium voltage drive.

Moreover, the effective switching frequency at the AC voltage output terminal is approximately 20 kHz. The simulation associated with the graph 50 used a 1.7 kV SiC MOSFETs as the SiC MOSFETs 14 and 6.5 kV/250 A Si IGBTs as the Si IGBTs 12 as part of the hybrid converter system 10. As shown in the graph 50, the hybrid system 10 has a 20% reduction in total loss compared the full SiC 3-level converter, while also representing a reduction in component cost.

Referring particularly to FIGS. 4-17, various schematic diagrams illustrating a system and method for modulating a voltage output of a hybrid converter system, such as the hybrid converter system 10 of FIG. 1, are illustrated. More specifically, the method for modulating the voltage output (e.g. $V_{OUT}$) of the hybrid converter system 10 may include switching between operational states of the hybrid converter system 10 based on the desired voltage output (e.g. $V_{OUT}$). Further, as shown, each operational state includes one of the Si IGBTs 12 from each of the first and second sets 16, 18 of Si-based power electronic devices and one of the SiC MOSFETs 14 from the first set 20 of SiC-based power electronic devices being switched on, with the remaining Si-based and SiC-based power electronic devices being switched off.

Figure 7:
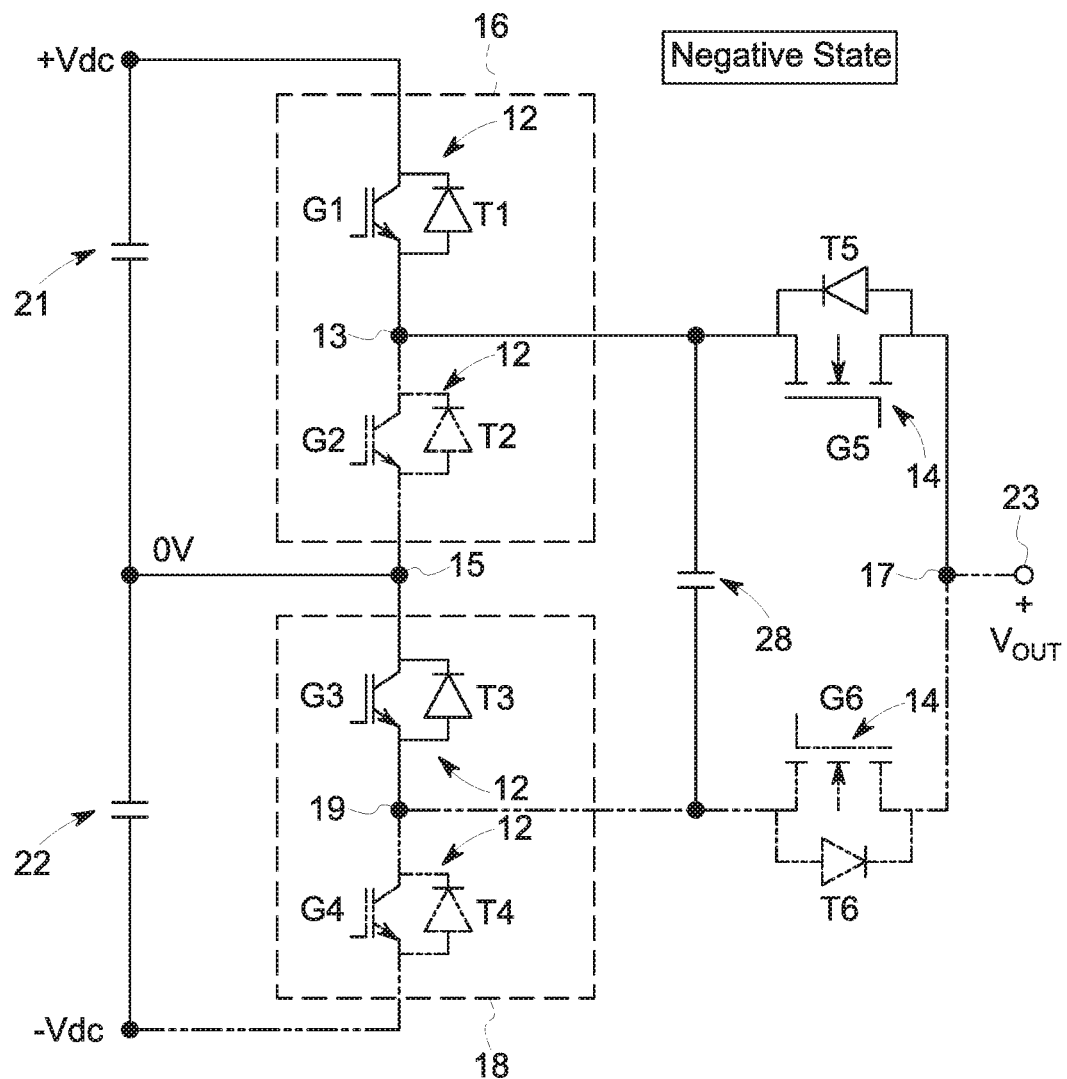
FIG. 7 illustrates a schematic diagram of a further embodiment of a three-level hybrid converter system according to the present disclosure, particularly illustrating a negative state of the hybrid converter system.

For example, in certain embodiments, as shown in FIGS. 4-7, the operational states of the hybrid converter system 10 may include a positive state (FIG. 4), a p-type zero state (FIG. 5), an n-type zero state (FIG. 6), and a negative state (FIG. 7). For the positive state, a voltage output includes a positive voltage value. For the p-type zero state and the n-type zero state, the voltage output is zero. For the negative state, the voltage output includes a negative voltage value. As such, the processor 26 may switch between each of the operational states by alternating which of the Si IGBTs 12 from each of the first and second sets 16, 18 of Si-based power electronic devices and the SiC MOSFETs 14 from the first set 20 of SiC-based power electronic devices are switched on. Thus, in certain embodiments, the step of switching between the operational states may include providing, via the processor 26, turn-on first gate signals to one of the Si IGBTs 12 from each of the first and second sets 16, 18 of Si-based power electronic devices and one of the SiC MOSFETs 14 from the first set 20 of SiC-based power electronic devices based on the desired voltage output and providing turn-off gate signals to the remaining Si-based and SiC-based power electronic devices based on the desired voltage output. Further, as mentioned, each SiC MOSFETs 14 of the first set 20 of SiC-based power electronic devices switches at a higher frequency as compared to each Si IGBTs 12 of the first and second sets 16, 18 of the Si-based power electronic devices. As generally shown in the figures, the phantom lines indicate which switches are switched on, whereas the solid lines indicate which switches are turned off.

Figure 8:
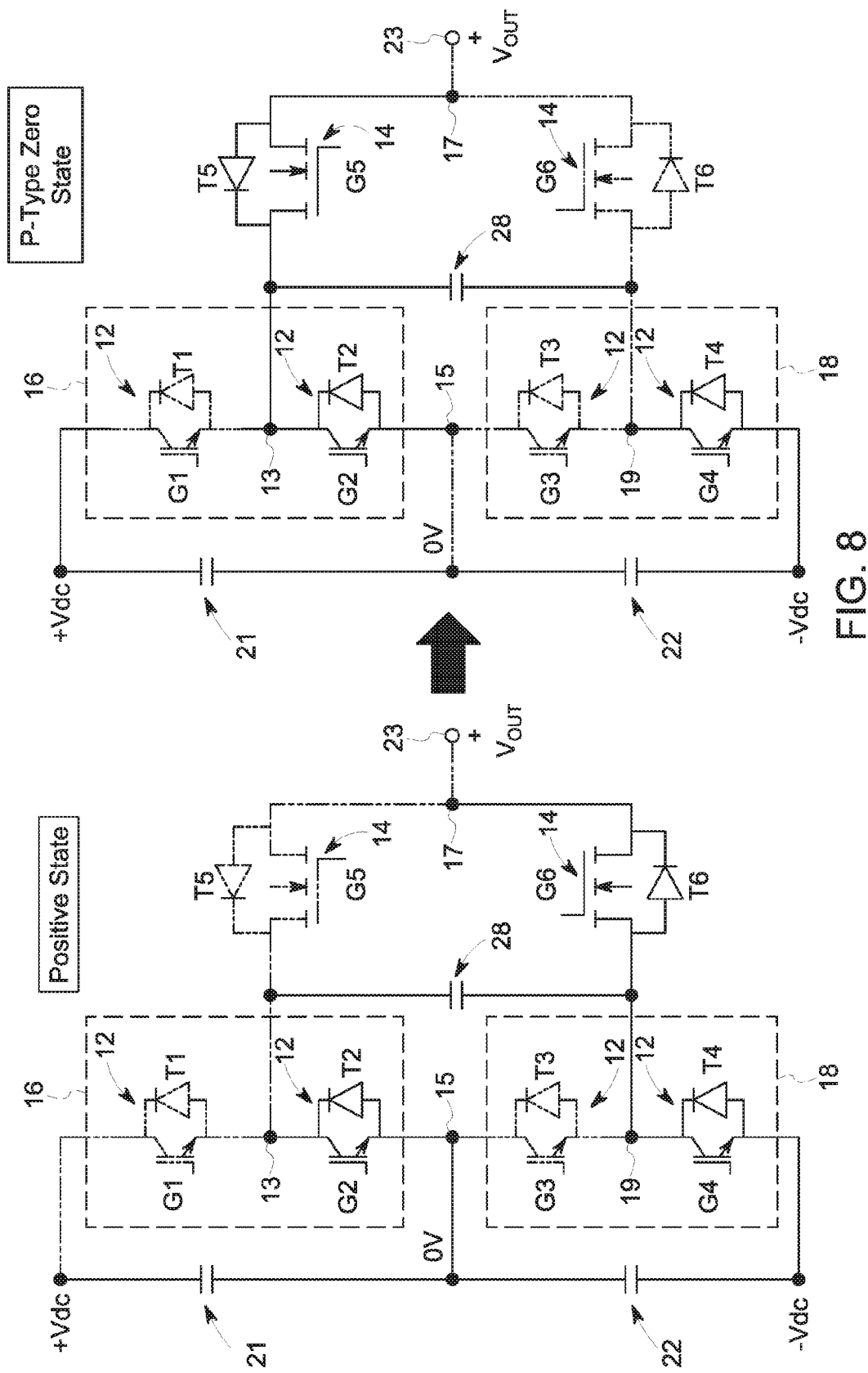
FIG. 8 illustrates a schematic diagram of one embodiment of a three-level hybrid converter system according to the present disclosure, particularly illustrating the hybrid converter system being switched from a positive state to a p-type zero state.

More specifically, as shown in FIGS. 8-11, various schematic diagrams illustrating how the processor 26 switches between the multiple operational states are illustrated. For example, as shown in FIG. 8, a schematic diagram of the hybrid converter system 10 switching from the positive state to the p-type zero state is illustrated. Further, as shown, during the positive state, the first Si-based power electronic device from the first set 16 of Si-based power electronic devices (e.g. T1), the third Si-based power electronic devices from the second set 18 of Si-based power electronic devices (e.g. T3), and the first SiC-based power electronic device from the first set 20 of SiC-based power electronic devices (e.g. T5) are switched on as indicated in phantom.

Thus, to switch from the positive state to the p-type zero state, the processor 26 is configured to switch off T5 and switch on the second SiC-based power electronic device from the first set 20 of SiC-based power electronic devices (e.g. T6), with T1 and T3 remaining on and T2 and T4 remaining off. Further, the gate signals for T5 and T6 may be complementary with a small dead time.

Figure 9:
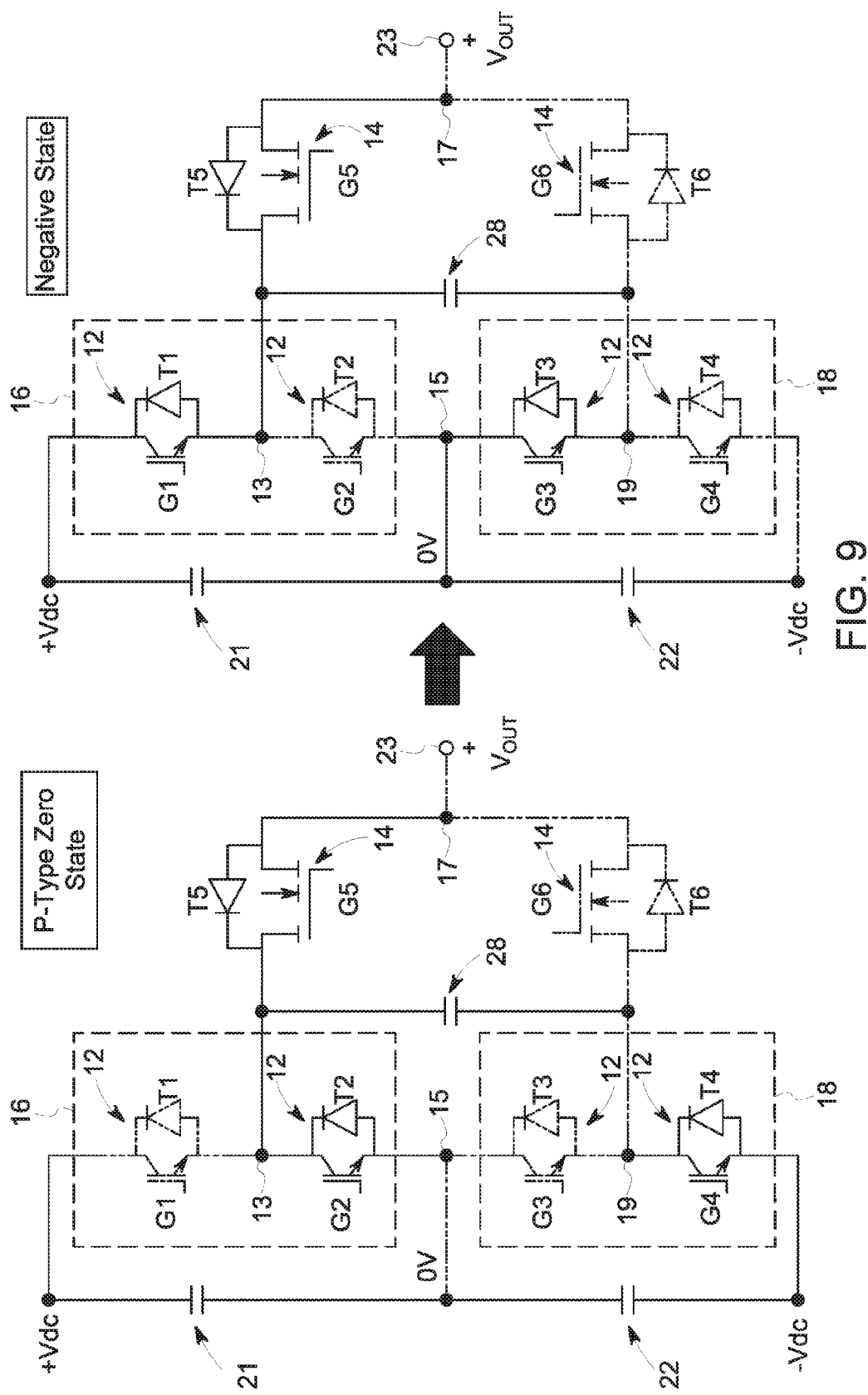
FIG. 9 illustrates a schematic diagram of another embodiment of a three-level hybrid converter system according to the present disclosure, particularly illustrating the hybrid converter system being switched from a p-type zero state to a negative state.

Referring now to FIG. 9, the processor 26 is further configured to switch from the p-type zero state of the voltage converter 10 to the negative operational state. More specifically, as shown, the processor 26 may switch from the p-type zero state to the negative state by switching off the first and third Si-based power electronic devices (e.g. T1 and T3) and switching on the second and fourth Si-based power electronic devices (e.g. T2 and T4), with the second SiC-based power electronic device from the first set 20 of SiC-based power electronic devices (e.g. T6) remaining switched on and the first SiC-based power electronic device from the first set 20 of SiC-based power electronic devices (e.g. T5) remaining switched off. In other words, T1 and T3 can share the same gate signal and T2 and T4 can share the same gate signal. As such, the two gate signals are complementary with a small dead time.

Figure 10:
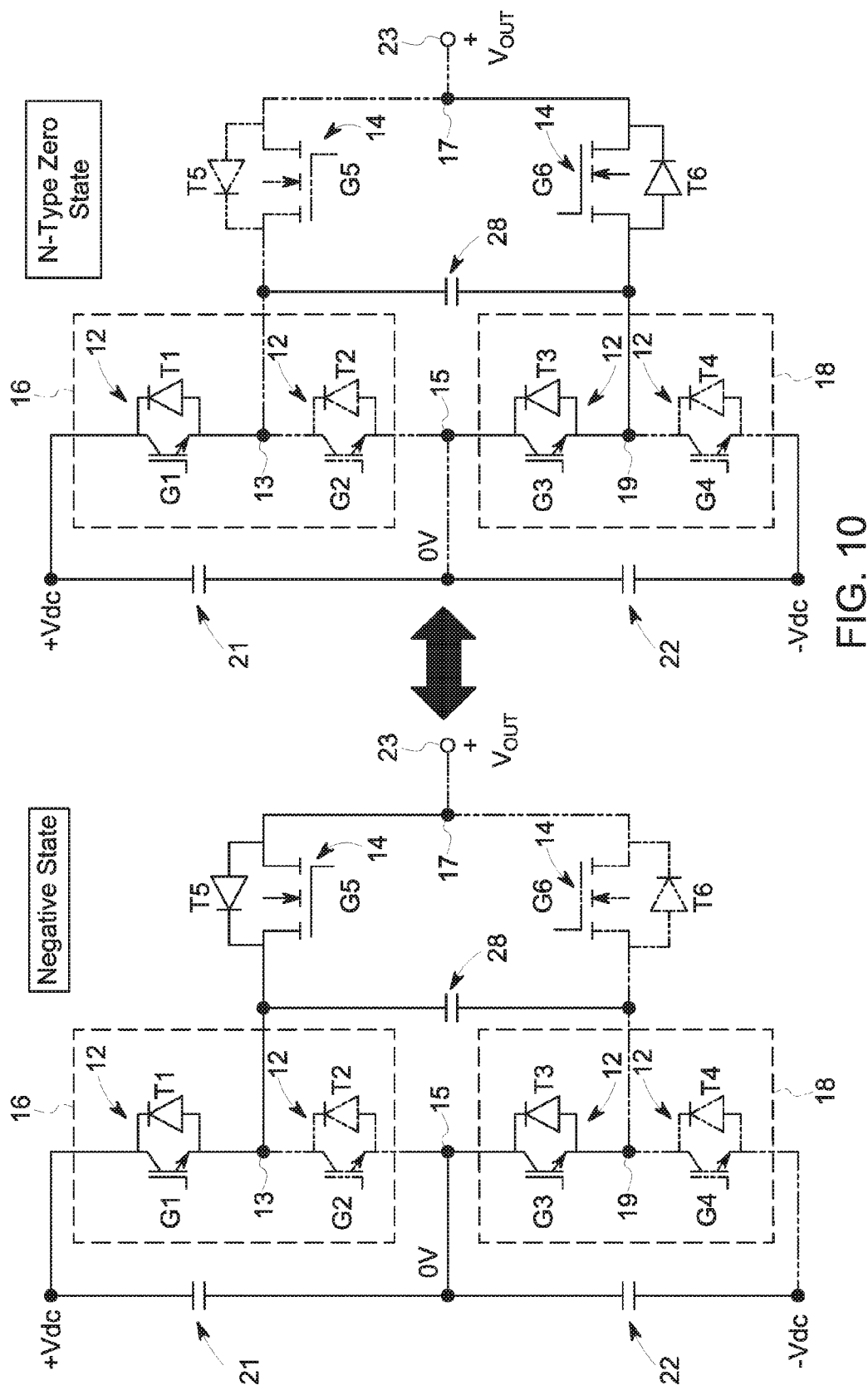
FIG. 10 illustrates a schematic diagram of still another embodiment of a three-level hybrid converter system according to the present disclosure, particularly illustrating the hybrid converter system being switched from a negative state to an n-type zero state.

Referring now to FIG. 10, the processor 26 is configured to switch from negative state of the voltage converter 10 to the n-type zero state. More specifically, as shown, the processor 26 may switch from the negative state to the n-type zero state by switching on the first SiC-based power electronic device from the first set 20 of SiC-based power electronic devices (e.g. T5) and switching off the second SiC-based power electronic device from the first set 20 of SiC-based power electronic devices (e.g. T6). Further, as shown, T2 and T4 remain on and the gate signals for T5 and T6 are complementary with a small dead time.

Figure 11:
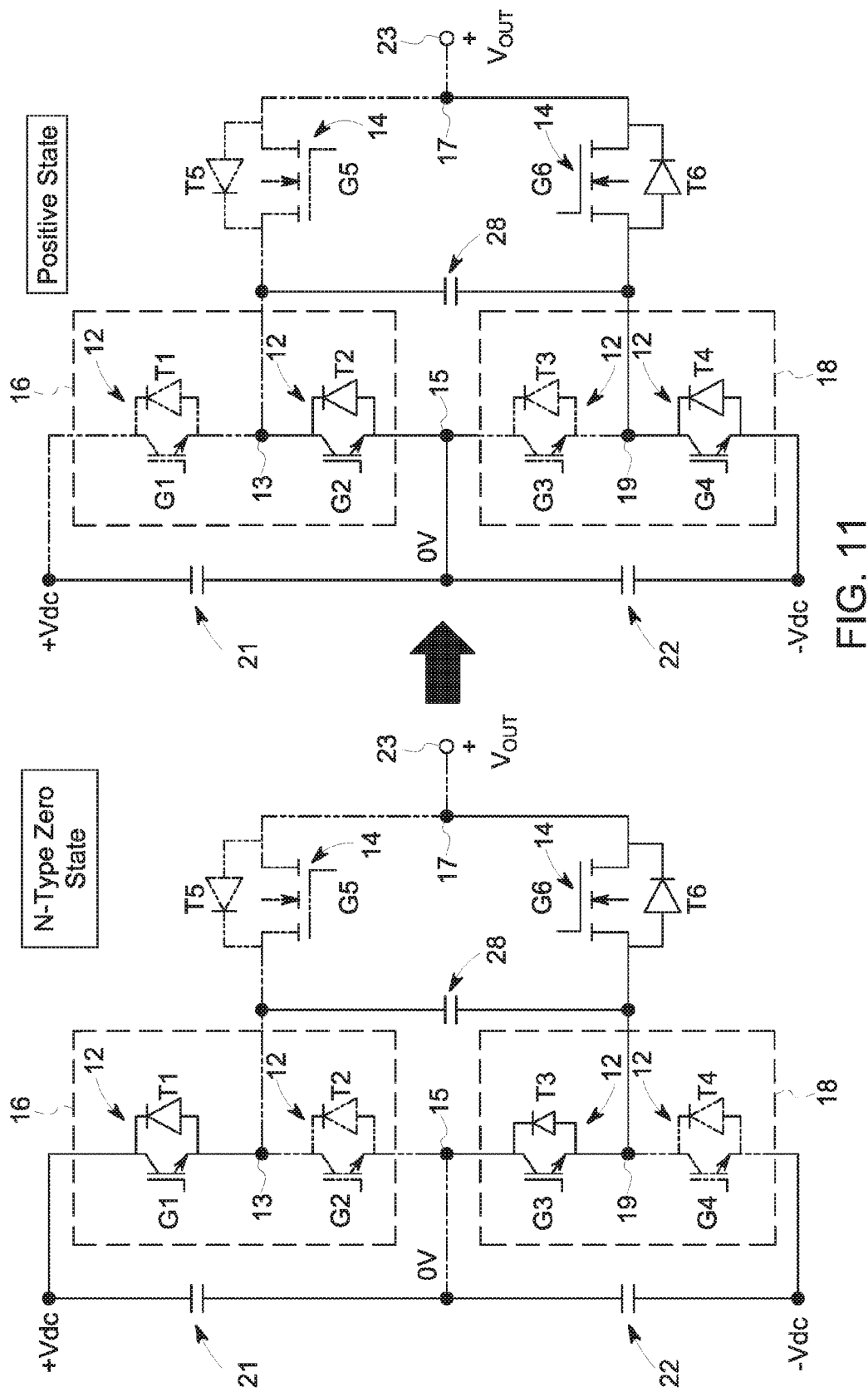
FIG. 11 illustrates a schematic diagram of yet another embodiment of a three-level hybrid converter system according to the present disclosure, particularly illustrating the hybrid converter system being switched from an n-type zero state to a positive state.

Referring now to FIG. 11, the processor 26 is also configured to switch from the n-type zero state of the voltage converter 10 to the positive state. More specifically, as shown, the processor 26 may switch from the n-type zero state to the positive state by switching off the second and fourth Si-based power electronic devices (e.g. T2 and T4) and switching on the first and third Si-based power electronic devices (e.g. T1 and T3), wherein the second SiC-based power electronic device from the first set 20 of SiC-based power electronic devices (e.g. T6) remains switched off and the first SiC-based power electronic device from the first set 20 of SiC-based power electronic devices (e.g. T5) remains switched on. In other words, T1 and T3 can share the same gate signal and T2 and T4 can share the same gate signal. As such, the two gate signals are complementary with a small dead time.

Figure 12:
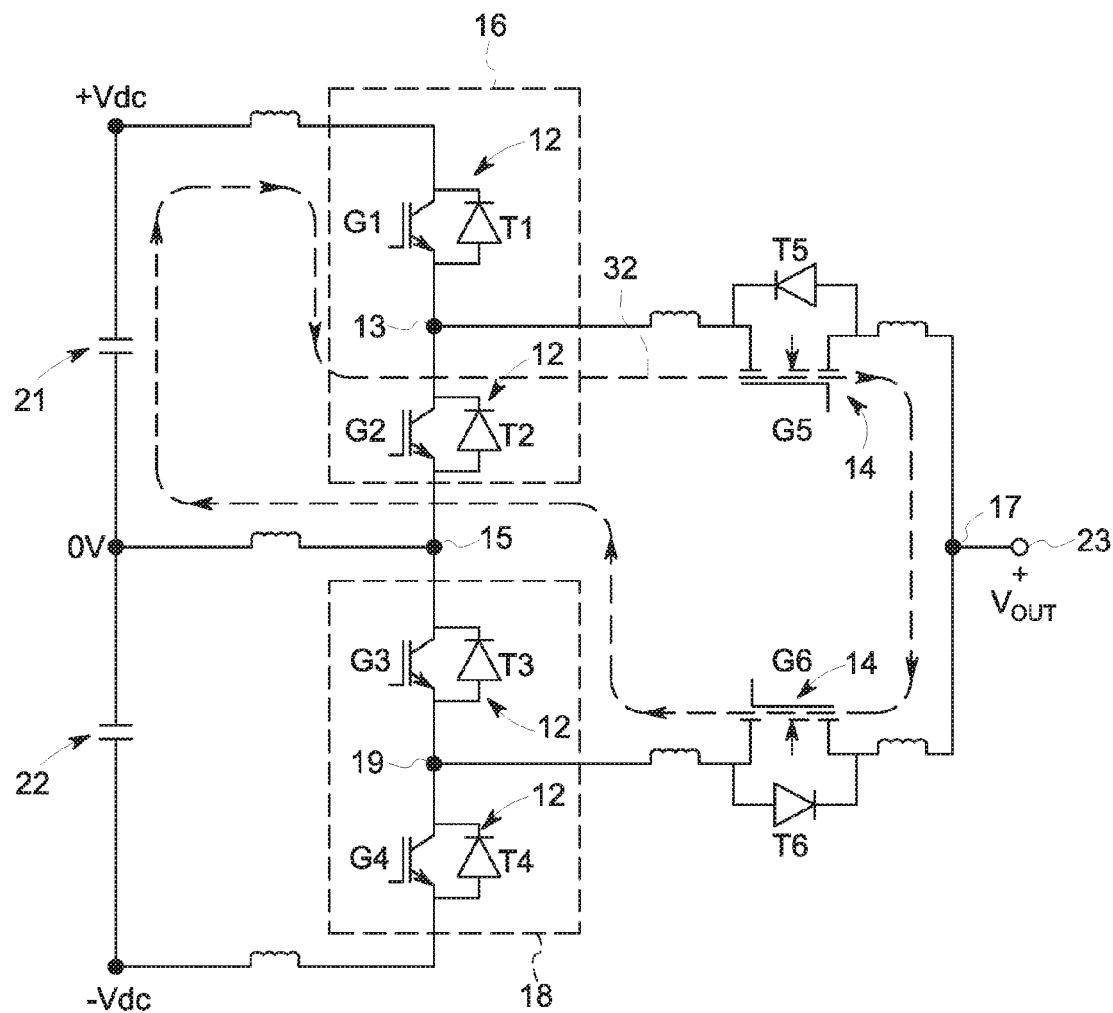
FIG. 12 illustrates a schematic diagram of one embodiment of a three-level hybrid converter system without a snubber capacitor according to the present disclosure.
Figure 13:
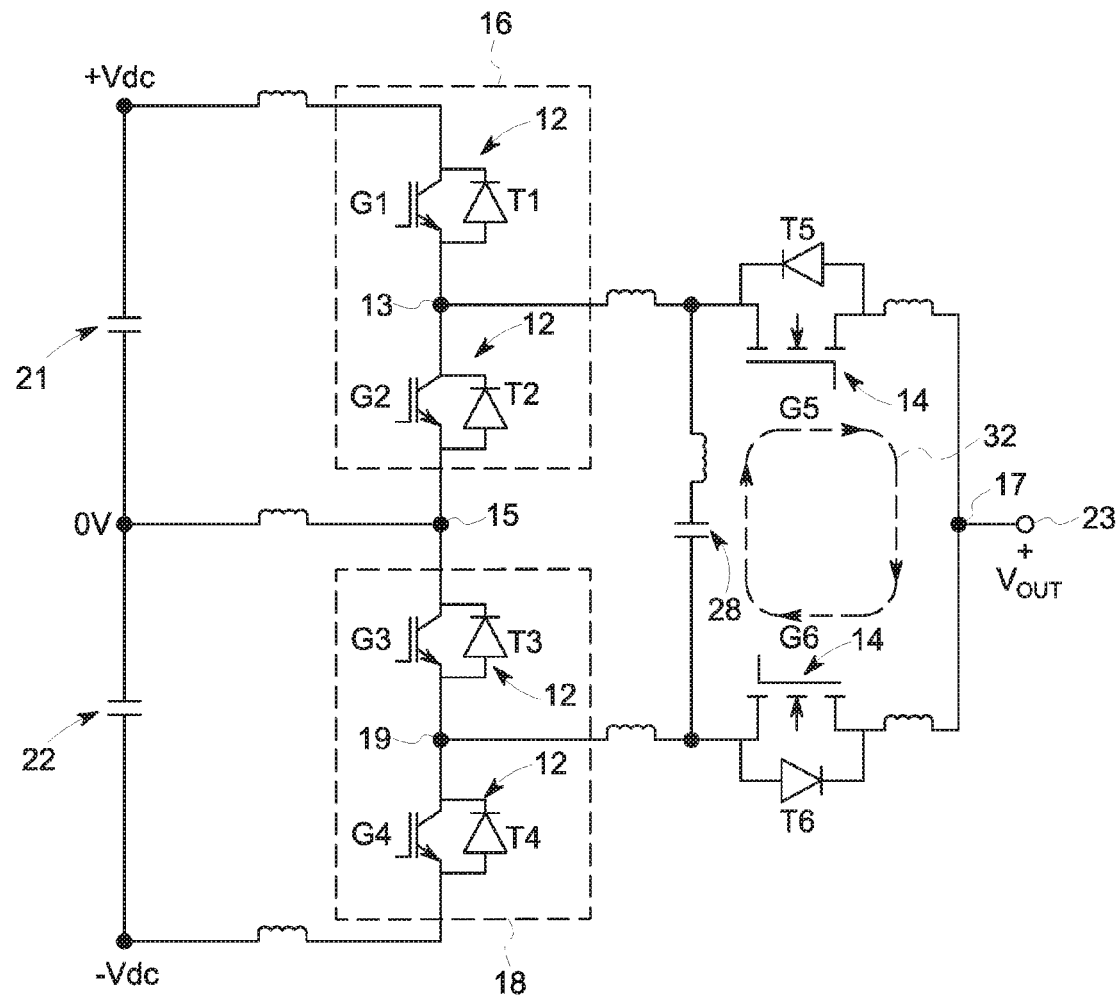
FIG. 13 illustrates a schematic diagram of one embodiment of a three-level hybrid converter system with a snubber capacitor according to the present disclosure.

Referring now to FIGS. 12 and 13, schematic diagrams of a hybrid converter system without a snubber capacitor (FIG. 12) and with a snubber capacitor 28 (FIG. 13) are illustrated. More specifically, as shown, the diagrams illustrate the current commutation between the positive and p-type zero states for each embodiment. For example, as indicated by the phantom loops 32 in each respective figure, the snubber capacitor 28 is configured to reduce the total parasitic inductance in the current commutation loop. In other words, lower loop inductance (i.e. a smaller loop size) generally corresponds to lower voltage stress across the SiC MOSFETs 14 for the same di/dt. Similarly, for the same voltage stresses, a higher di/dt can be used to reduce switching loss. As such, the snubber capacitor 28 reduces the inductance thereby reducing switching losses of the hybrid converter system 10.

Figure 14:
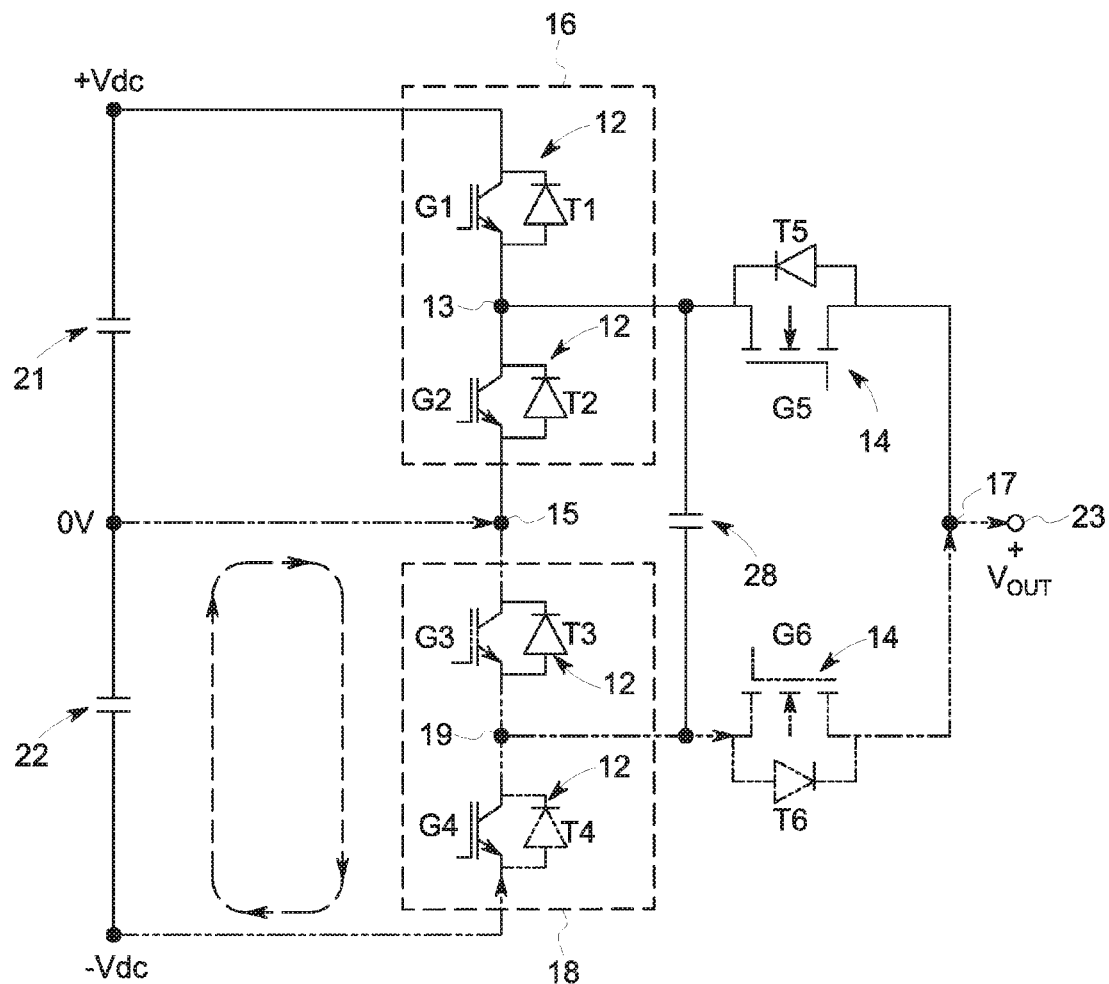
FIG. 14 illustrates a schematic diagram of one embodiment of a three-level hybrid converter system according to the present disclosure, particularly illustrating the current commutation from the p-type zero state to the negative state for an inductive load.
Figure 15:
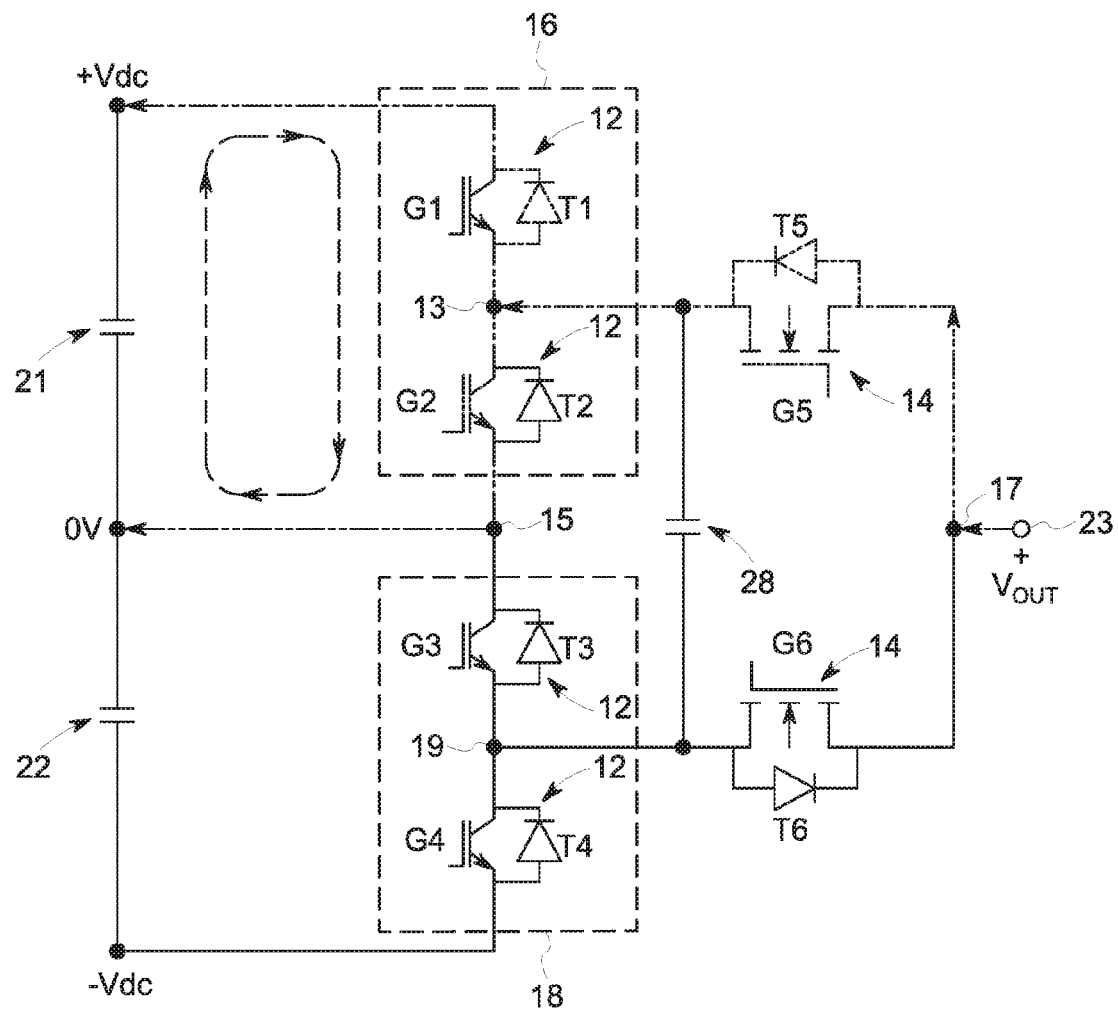
FIG. 15 illustrates a schematic diagram of another embodiment of a three-level hybrid converter system according to the present disclosure, particularly illustrating the current commutation from the n-type zero state to the positive state for an inductive load.
Figure 16:
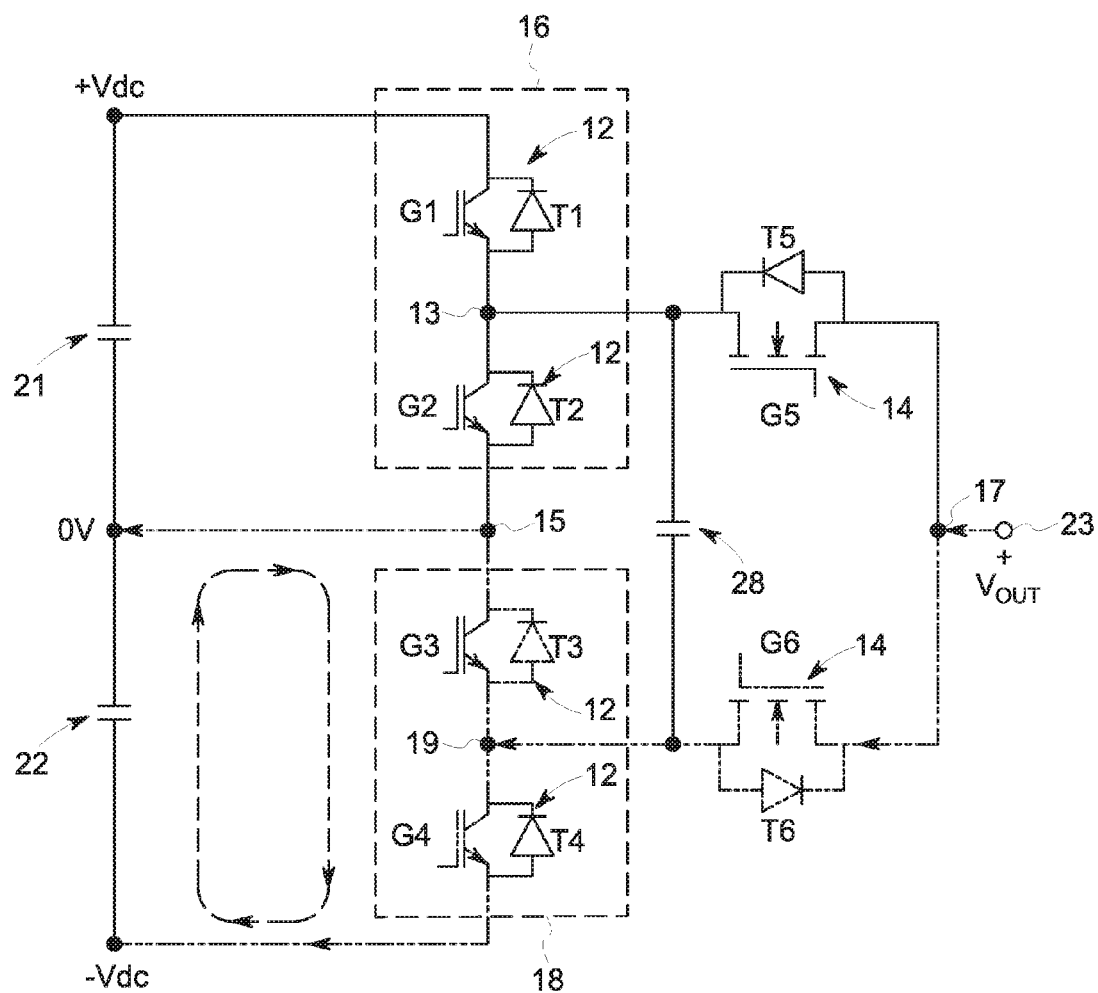
FIG. 16 illustrates a schematic diagram of yet another embodiment of a three-level hybrid converter system according to the present disclosure, particularly illustrating the current commutation from the p-type zero state to the negative state for a capacitive load.
Figure 17:
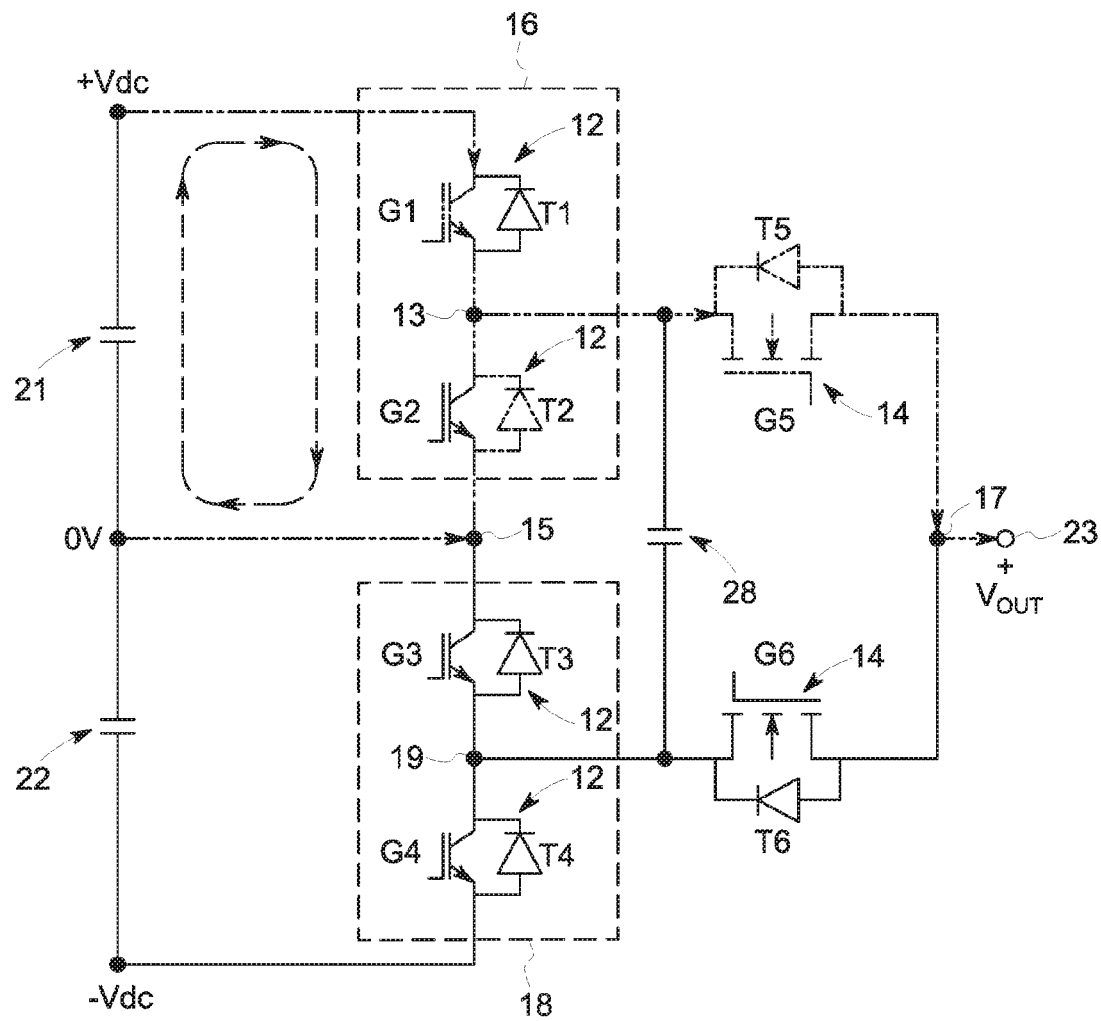
FIG. 17 illustrates a schematic diagram of still another embodiment of a three-level hybrid converter system according to the present disclosure, particularly illustrating the current commutation from the n-type zero state to the positive state for a capacitive load.

Referring now to FIGS. 14-17, schematic diagrams of various embodiments of hybrid converter system 10 according to the present disclosure are illustrated, particularly illustrating IGBT losses with an inductive load (FIGS. 14 and 15) and IGBT losses with a capacitive load (FIGS. 16 and 17). More specifically, as shown in FIGS. 14 and 15, the current commutation from the p-type zero state to the negative state for an inductive load (FIG. 14) and the current communication from the n-type zero state to the positive state for an inductive load (FIG. 15) are illustrated. In addition, as shown in FIGS. 16 and 17, the current commutation from the p-type zero state to the negative state for a capacitive load (FIG. 16) and the current communication from the n-type zero state to the positive state for a capacitive load (FIG. 17) are illustrated. It is important to note that switching from the p-type zero state to the negative state and switching from the n-type zero state to the positive state corresponds to the zero crossing points. Further, as shown in FIGS. 14 and 15, with an inductive load, only the inner IGBT (e.g. T2 and T3) have turn-off loss. In contrast, as shown in FIGS. 16 and 17, with a capacitive load, only the outer IGBT (e.g. T1 and T4) have turn-on loss and the inner diodes have reverse recovery loss.

Figure 18:
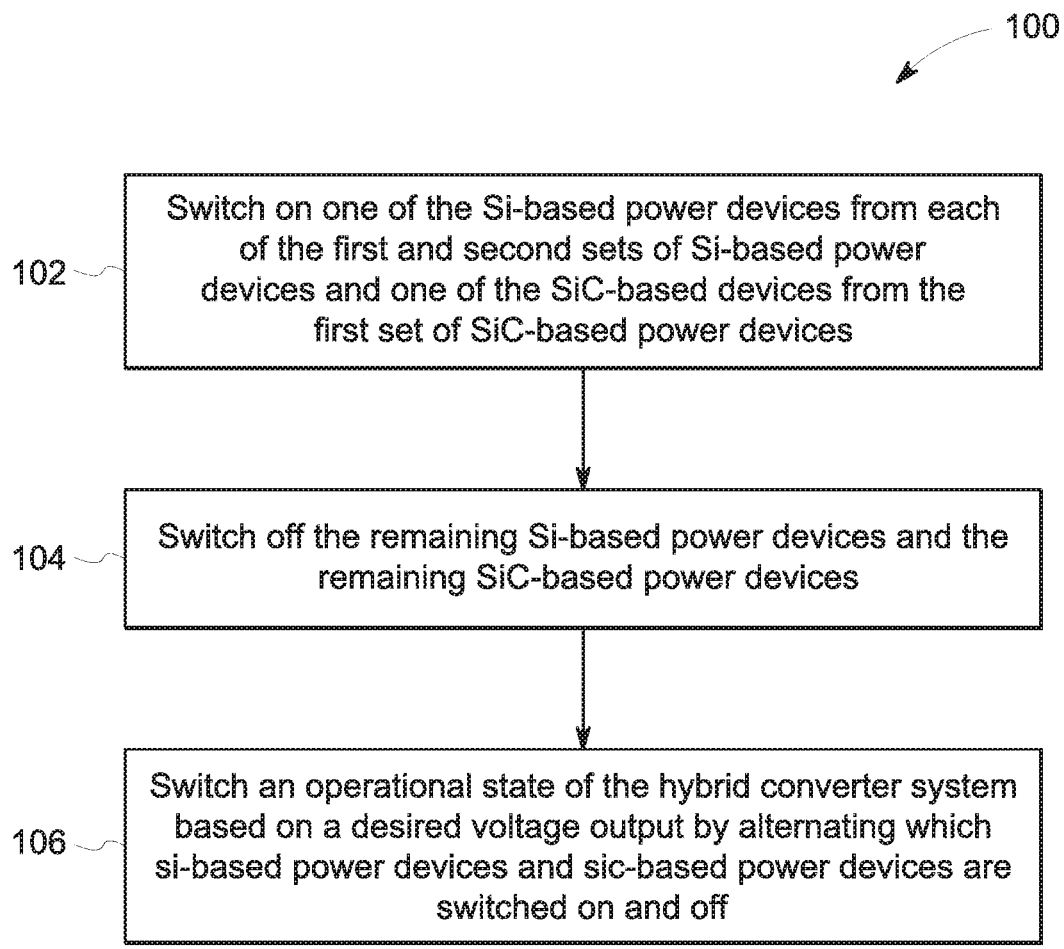
FIG. 18 illustrates a flow diagram of one embodiment of a method for modulating a voltage output of a hybrid converter system according to the present disclosure.

Referring now to FIG. 18, a flow diagram of another embodiment of a method 100 for modulating a voltage output of a hybrid converter system, such as the hybrid converter system 100 of FIG. 1, is illustrated. As shown at 102, the method 100 includes switching on one of the Si-based power electronic devices from each of the first and second sets of Si-based power electronic devices and one of the SiC-based devices from the first set of SiC-based power electronic devices. As shown at 104, the method 100 includes switching off the remaining Si-based power electronic devices and the remaining SiC-based power electronic devices. As shown at 106, the method 100 includes switching an operational state of the hybrid converter system based on a desired voltage output by alternating which Si-based power electronic devices and SiC-based power electronic devices are switched on and off. Moreover, each SiC-based power electronic device of the first set of SiC-based power electronic devices switches only at switching frequency of one kilo-Hertz (kHz) or greater and each Si-based power electronic device of the first and second sets of Si-based power electronic devices switches only at a fundamental frequency that is lower than the switching frequency.

Technical effects of the invention include combining the low switching loss benefits of SiC-based power electronic devices with the low conduction losses benefits of Si-based power electronic devices to provide an efficient converter system for converting voltages from a DC signal to an AC signal and vice versa. Moreover, considering the relatively high costs associated with SiC-based power electronic devices as compared to Si-based power electronic devices, the presently disclosed embodiments provide a system that leverages the benefits of the SiC-based power electronic devices, while minimizing the number of SiC-based power electronic devices used in the system. As a result, the hybrid converter systems described herein provides a lower cost and better performance alternative as compared to a non-hybrid converter system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for modulating a voltage output of a hybrid converter system having a first set of silicon (Si)-based power electronic devices coupled to a first voltage source, a second set of Si-based power electronic devices coupled to a second voltage source, and a first set of silicon-carbide (SiC)-based power electronic devices coupled to the first and second sets of Si-based power electronic devices, the method comprising:
   switching between operational states of the hybrid converter system based on a desired voltage output, wherein each operational state comprises one of the Si-based power electronic devices from each of the first and second sets of Si-based power electronic devices and one of the SiC-based devices from the first set of SiC-based power electronic devices being switched on and the remaining Si-based and SiC-based power electronic devices being switched off, and
   wherein each SiC-based power electronic device of the first set of SiC-based power electronic devices switches at a higher frequency as compared to each Si-based power electronic device of the first and second sets of the Si-based power electronic devices.

2. The method of claim 1, wherein switching between the operational states further comprises:
   providing, via a processor, turn-on first gate signals to one of the Si-based power electronic devices from each of the first and second sets of Si-based power electronic devices and one of the SiC-based devices from the first set of SiC-based power electronic devices based on a desired voltage output, and
   providing, via the processor, turn-off gate signals to the remaining Si-based and SiC-based power electronic devices based on the desired voltage output.

3. The method of claim 1, wherein the operational states of the voltage converter comprise a positive state, a p-type zero state, a negative state, and an n-type zero state.

4. The method of claim 3, further comprising, during the positive state of the voltage converter, switching on a first Si-based power electronic device from the first set of Si-based power electronic devices, a third Si-based power electronic devices from the second set of Si-based power electronic devices, and a first SiC-based power electronic device from the first set of SiC-based power electronic devices, wherein a voltage output of the positive state comprises a positive voltage value.

5. The method of claim 4, further comprising switching from the positive state of the voltage converter to the p-type zero state by switching off the first SiC-based power electronic device from the first set of SiC-based power electronic devices and switching on a second SiC-based power electronic device from the first set of SiC-based power electronic devices, wherein a voltage output of the p-type zero state is zero.

6. The method of claim 5, further comprising switching from the p-type zero state of the voltage converter to the negative state by switching off the first and third Si-based power electronic devices and switching on the second and fourth Si-based power electronic devices, wherein the second SiC-based power electronic device from the first set of SiC-based power electronic devices remains switched on and the first SiC-based power electronic device from the first set of SiC-based power electronic devices remains switched off, wherein a voltage output of the negative state comprises a negative voltage value.

7. The method of claim 6, further comprising switching from the negative state of the voltage converter to the n-type zero state by switching on the first SiC-based power electronic device from the first set of SiC-based power electronic devices and switching off the second SiC-based power electronic device from the first set of SiC-based power electronic devices, wherein a voltage output of the n-type zero state is zero.

8. The method of claim 7, further comprising switching from the n-type zero state to the positive state by switching off the second and fourth Si-based power electronic devices and switching on the first and third Si-based power electronic devices, wherein the second SiC-based power electronic device from the first set of SiC-based power electronic devices remains switched off and the first SiC-based power electronic device from the first set of SiC-based power electronic devices remains switched on.

9. The method of claim 1, further comprising coupling a snubber capacitor between the first set of SiC-based power electronic devices, the snubber capacitor configured to reduce switching losses of the hybrid converter system.

10. The method of claim 1, wherein each Si-based power electronic device of the first and second sets of Si-based power electronic devices is configured to switch at a fundamental frequency.

11. The method of claim 1, wherein each SiC-based power electronic device of the first set of SiC-based power electronic devices is configured to switch at a switching frequency comprising one kilo-Hertz (kHz) or greater.

12. The method of claim 1, wherein each of the first and second sets of Si-based power electronic devices comprises one or more insulated-gate bipolar transistors (IGBTs), and wherein the first set of SiC-based power electronic devices comprises one or more metal-oxide-semiconductor field-effect transistors (MOSFETs).

13. A system for modulating a voltage output of a hybrid converter system having a first set of silicon (Si)-based power electronic devices coupled to a first voltage source, a second set of Si-based power electronic devices coupled to a second voltage source, and a first set of silicon-carbide (SiC)-based power electronic devices coupled to the first and second sets of Si-based power electronic devices, the system comprising:
a controller having one or more processors configured to perform one or more operations, the one or more operations comprising:
switching between operational states of the hybrid converter system based on a desired voltage output, wherein each operational state comprises one of the Si-based power electronic devices from each of the first and second sets of Si-based power electronic devices and one of the SiC-based devices from the first set of SiC-based power electronic devices being switched on and the remaining Si-based and SiC-based power electronic devices being switched off, and
wherein each SiC-based power electronic device of the first set of SiC-based power electronic devices switches at a higher frequency as compared to each Si-based power electronic device of the first and second sets of the Si-based power electronic devices.

14. A method for modulating a voltage output of a hybrid converter system having a first set of silicon (Si)-based power electronic devices coupled to a first voltage source, a second set of Si-based power electronic devices coupled to a second voltage source, and a first set of silicon-carbide (SiC)-based power electronic devices coupled to the first and second sets of Si-based power electronic devices, the method comprising:
switching on one of the Si-based power electronic devices from each of the first and second sets of Si-based power electronic devices and one of the SiC-based devices from the first set of SiC-based power electronic devices;
switching off the remaining Si-based power electronic devices and the remaining SiC-based power electronic devices; and
switching an operational state of the hybrid converter system based on a desired voltage output by alternating which Si-based power electronic devices and SiC-based power electronic devices are switched on and off,
wherein each SiC-based power electronic device of the first set of SiC-based power electronic devices switches only at switching frequency of one kilo-Hertz (kHz) or greater and each Si-based power electronic device of the first and second sets of Si-based power electronic devices switches only at a fundamental frequency that is lower than the switching frequency.

15. The system of claim 14, further comprising, during a positive state of the voltage converter, switching on a first Si-based power electronic device from the first set of Si-based power electronic devices, a third Si-based power electronic devices from the second set of Si-based power electronic devices, and a first SiC-based power electronic device from the first set of SiC-based power electronic devices, wherein a voltage output of the positive state comprises a positive voltage value.

16. The system of claim 15, further comprising switching from the positive state of the voltage converter to a p-type zero state by switching off the first SiC-based power electronic device from the first set of SiC-based power electronic devices and switching on a second SiC-based power electronic device from the first set of SiC-based power electronic devices, wherein a voltage output of the p-type zero state is zero.

17. The system of claim 16, further comprising switching from the p-type zero state of the voltage converter to a negative state by switching off the first and third Si-based power electronic devices and switching on the second and fourth Si-based power electronic devices, wherein the second SiC-based power electronic device from the first set of SiC-based power electronic devices remains switched on and the first SiC-based power electronic device from the first set of SiC-based power electronic devices remains switched off, wherein a voltage output of the negative state comprises a negative voltage value.

18. The system of claim 17, further comprising switching from the negative state of the voltage converter to an n-type zero state by switching on the first SiC-based power electronic device from the first set of SiC-based power electronic devices and switching off the second SiC-based power electronic device from the first set of SiC-based power electronic devices, wherein a voltage output of the n-type zero state is zero.

19. The system of claim 18, further comprising switching from the n-type zero state to the positive state by switching off the second and fourth Si-based power electronic devices and switching on the first and third Si-based power electronic devices, wherein the second SiC-based power electronic device from the first set of SiC-based power electronic devices remains switched off and the first SiC-based power electronic device from the first set of SiC-based power electronic devices remains switched on.

20. The system of claim 14, further comprising a snubber capacitor coupled between the first set of SiC-based power electronic devices, the snubber capacitor configured to reduce switching losses of the hybrid converter system.

* * * * *